United States Patent
Yamazaki et al.

(10) Patent No.: US 7,376,329 B2
(45) Date of Patent: May 20, 2008

(54) LASER HARDENING TOOL

(75) Inventors: Tsunehiko Yamazaki, Aichi pref. (JP); Naoomi Miyakawa, Aichi pref. (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 0 days.

(21) Appl. No.: 11/611,243

(22) Filed: Dec. 15, 2006

(65) Prior Publication Data
US 2007/0158318 A1    Jul. 12, 2007

(30) Foreign Application Priority Data
Dec. 28, 2005 (JP) .............................. 2005-378955

(51) Int. Cl.
*G02B 6/10* (2006.01)
(52) U.S. Cl. .................... 385/146; 385/116; 385/119
(58) Field of Classification Search ............... None
See application file for complete search history.

(56) References Cited

U.S. PATENT DOCUMENTS

| | | | |
|---|---|---|---|
| 6,385,371 B1 * | 5/2002 | Li ........................ | 385/43 |
| 7,248,614 B2 * | 7/2007 | Yamazaki et al. ........ | 372/64 |
| 2003/0021579 A1 | 1/2003 | Shinoda | |
| 2003/0174929 A1 * | 9/2003 | Rodgers et al. ........ | 385/18 |
| 2005/0031261 A1 | 2/2005 | Tanaka | |

FOREIGN PATENT DOCUMENTS

| | | |
|---|---|---|
| EP | 1 577 993 A | 9/2005 |
| JP | 03-071990 A | 3/1991 |
| JP | 2003-138314 | 5/2003 |
| JP | 2004-243406 A | 9/2004 |
| JP | 2004/3319820 * | 11/2004 |
| JP | 2005-238253 | 9/2005 |

OTHER PUBLICATIONS

European Search Report for corresponding Application No. 06405536 dated May 15, 2007.

* cited by examiner

*Primary Examiner*—Sung Pak
*Assistant Examiner*—Chad H Smith
(74) *Attorney, Agent, or Firm*—Renner, Otto, Boisselle & Sklar, LLP

(57) ABSTRACT

The invention provides a laser hardening tool having little laser output loss. The laser hardening tool 100 condenses the irradiated beams $LB_1$ from a semiconductor laser stack 120 via a condensing optical lens 134, and creates parallel light beams $LB_3$ via a diverging optical lens 142. The laser beams $LB_4$ having been bent by a first mirror 160 travels through an optical waveguide 150 having a rectangular cross-sectional shape. The laser beams $LB_5$ having been condensed by a re-condensing optical lens 170 are irradiated through a nozzle 190 to subject a work to hardening. The number of reflections of the laser beams $LB_4$ in the angular optical waveguide 150 is small, and thus the loss of laser output is reduced.

4 Claims, 5 Drawing Sheets

LASER HARDENING TOOL

The present application is based on and claims priority of Japanese patent application No. 2005-378955 filed on Dec. 28, 2005, the entire contents of which are hereby incorporated by reference.

BACKGROUND OF THE INVENTION

1. Field of the Invention

The present invention relates to a hardening tool that utilizes semiconductor laser.

2. Description of the Related Art

For example, Japanese Patent Application Laid-Open Publication No. 2003-138314 (patent document 1) discloses a laser hardening device proposed by the present applicant. Further, Japanese Patent Application Laid-Open Publication No. 2005-238253 (patent document 2) discloses a laser hardening tool capable of being attached in removable manner to a tool post of a machine tool.

According to these laser hardening tools, the laser beams output from a laser emission source such as a semiconductor laser bar or a semiconductor laser stack are transmitted via an optical fiber or a waveguide to a torch disposed at the end of the tool.

As shown in FIG. 10, the prior art laser beam waveguide 10 has an inner surface 12 formed of a cylindrical surface. Since the laser beams LB traveling through the waveguide having the cylindrical surface 12 rotate along the cylindrical surface, the number of reflections is increased. Since the reflectivity of the inner surface of the waveguide is 1.0 or smaller, the efficiency is deteriorated each time the beams are reflected, which causes the laser output to be reduced.

The present inventors have conducted various experiments on the effect that the cross-sectional shape of the optical waveguide has on the laser output efficiency, and confirmed that an optical waveguide 20 with a rectangular cross-section having its inner surfaces formed of planar surfaces 22 has reduced number of reflections, and thus realizes an optical waveguide having high output efficiency.

SUMMARY OF THE INVENTION

The object of the present invention is to provide a laser hardening tool based on the above-described knowledge.

In order to achieve the above object, the present invention provides a laser hardening tool comprising a semiconductor laser stack having semiconductors arranged in a matrix for outputting laser beams; a condensing optical system for condensing the laser beams output from the semiconductor laser stack; a diverging optical system for diverging the laser beams condensed by the condensing optical system so that the axis line of the laser beams become parallel; a rectangular (square) optical waveguide for guiding the laser beams output from the diverging optical system having a rectangular cross-sectional shape; a re-condensing optical system for re-condensing the laser beams having traveled through the rectangular optical waveguide; and an optical waveguide nozzle for outputting the re-condensed laser beams toward a work.

Further, the laser hardening tool comprises a first mirror disposed at an inlet port of the rectangular optical waveguide, and a second mirror disposed between the re-condensing optical system and the optical waveguide nozzle.

Moreover, the laser hardening tool comprises a cooling water channel for supplying cooling water provided in a lens holder of the condensing optical system, a lens holder of the diverging optical system, the first mirror, the rectangular optical waveguide, a lens holder of the re-condensing optical system, the second mirror and the optical waveguide nozzle; and the mirror surface for reflecting the laser beam is provided with a reflection amplifying coating layer.

The laser hardening tool of the present invention having the arrangements described above enables to guide the beams output from the semiconductor laser stack to the nozzle with little loss.

DETAILED DESCRIPTION OF THE PREFERRED EMBODIMENTS

Figure 1:
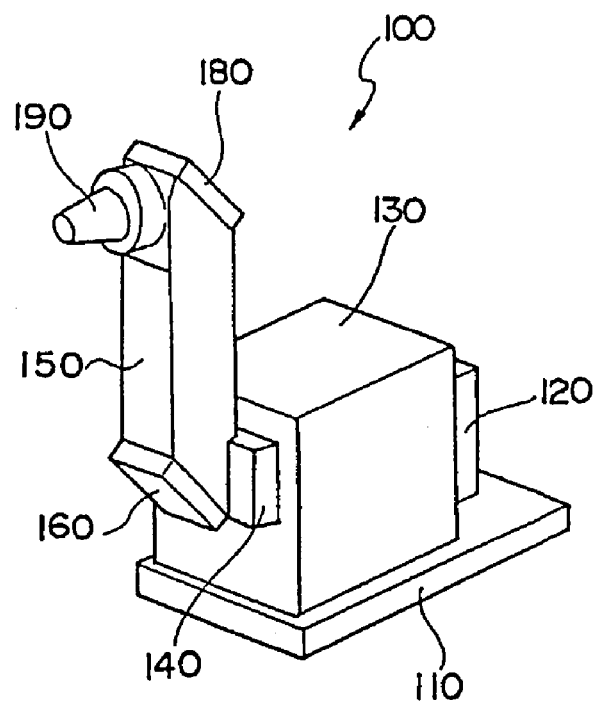
FIG. 1 is a perspective view of a laser hardening tool according to the present invention.
Figure 2:
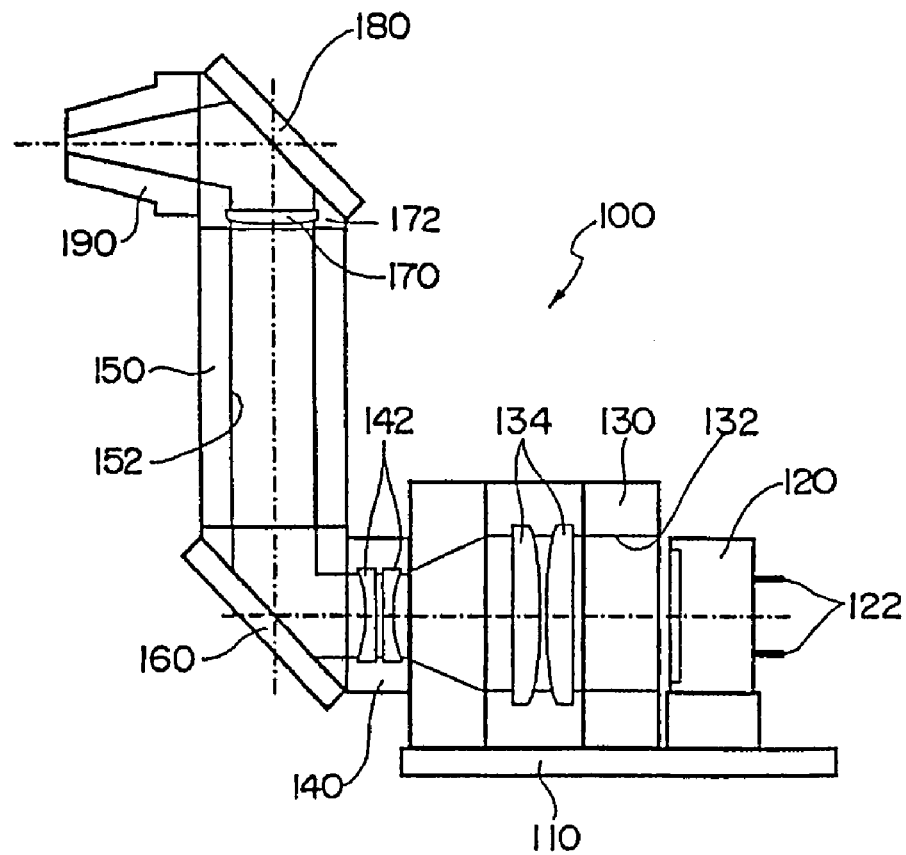
FIG. 2 is a cross-sectional side view of the laser hardening tool according to the present invention.
Figure 3:
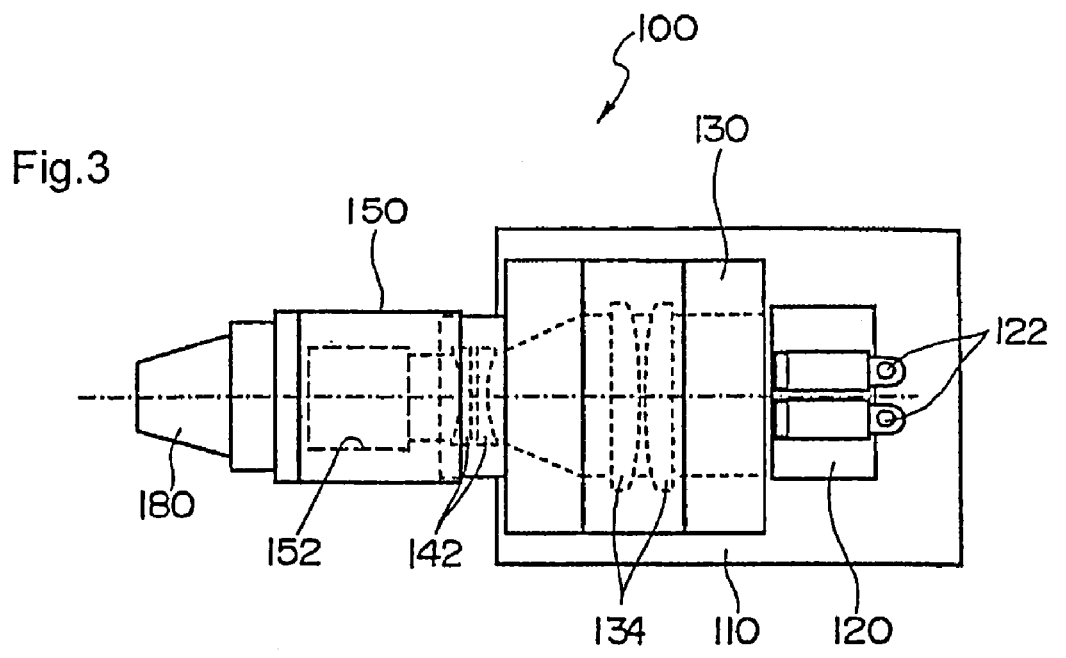
FIG. 3 is an upper view of FIG. 2.

FIG. 1 is a perspective view of a laser hardening tool according to the present invention, FIG. 2 is a cross-sectional side view showing the whole structure of the laser hardening tool according to the present invention, and FIG. 3 is an upper view of FIG. 2.

The laser hardening tool denoted as a whole by reference number 100 comprises a semiconductor laser stack 120 mounted on a base 110. The semiconductor laser stack 120 has power supply connecting terminals 122, which are connected to a power supply not shown.

The output of the semiconductor laser stack 120 is sent into a holder 130 having an optical passage 132. A condensing optical system (lens) 134 is disposed within the optical passage 132 of the holder 130 for condensing the output beams from the semiconductor laser stack 120.

The condensed laser beams are entered to a diverging optical lens 142 within a holder 140, where they are diverged so that the axis lines of the beams become parallel. The diverged laser beams are sent to a first mirror 160 attached to one end of a rectangular optical waveguide 150. The laser beams being turned by the mirror 160 toward the axial direction of the rectangular optical waveguide 150 advance while reflecting on a reflecting surface 152 on the inner side of the rectangular optical waveguide 150, and enter a re-condensing optical lens 170 within a holder 172.

The laser beams passing through the rectangular optical waveguide 150 have reduced number of reflections compared to the beams passing through the prior-art optical waveguide with a circular cross-section, and thus the beams are subjected to less attenuation.

The laser beams being re-condensed by the re-condensing optical lens 170 have their axis line changed for 90 degrees by a second mirror 180, and are irradiated through an optical waveguide nozzle 190 to subject a surface of a work not shown to hardening treatment.

The laser hardening tool 100 is heated by absorbing the laser beams passing therethrough. It is further subjected to external heating via the reflected heat from the work being hardened by the laser hardening tool.

Thus, the laser hardening tool 100 according to the present invention has a cooling channel for preventing temperature rise.

Figure 4:
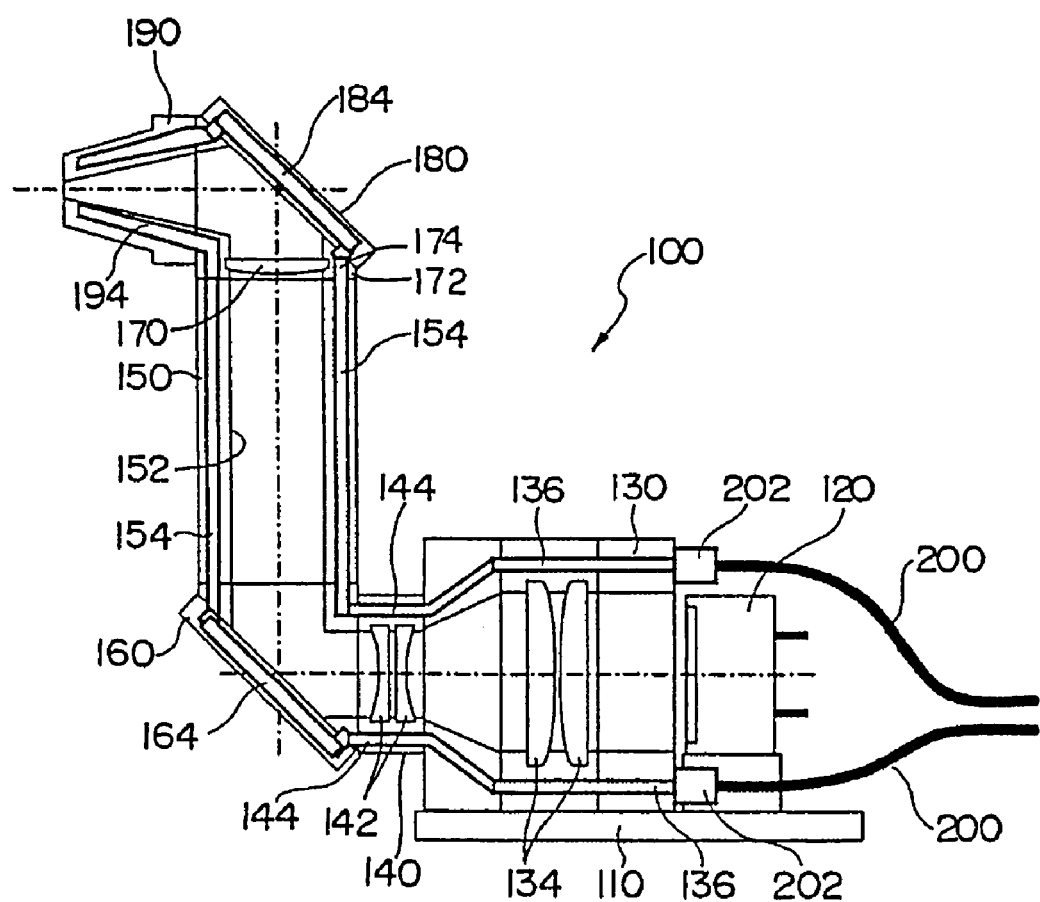
FIG. 4 is a cross-sectional side view of the cooling water channel of the laser hardening tool of the present invention.
Figure 5:
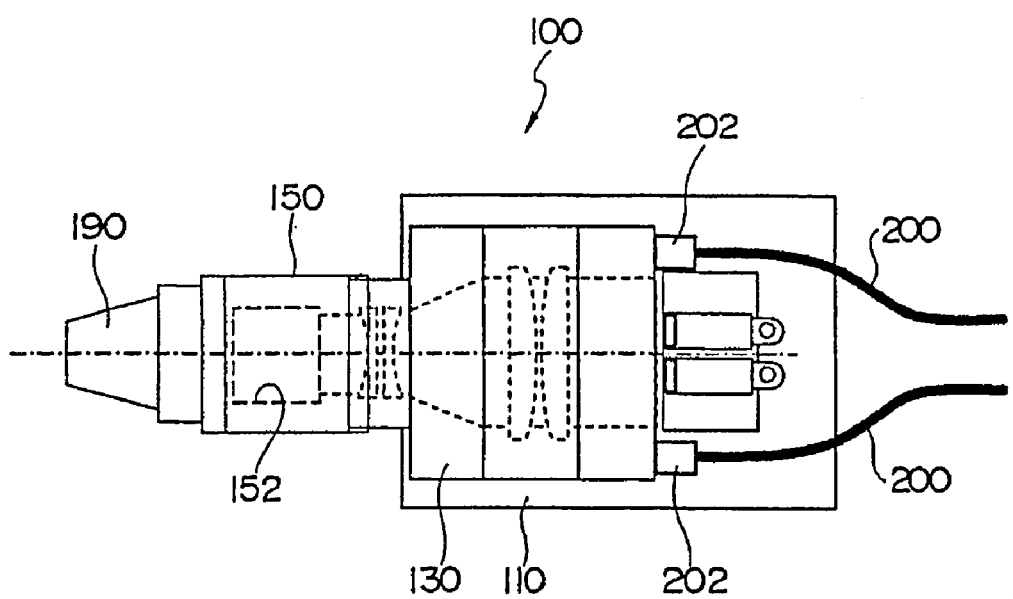
FIG. 5 is an upper view of FIG. 4.

FIG. 4 is a cross-sectional side view of the cooling channel provided in the laser hardening tool 100, and FIG. 5 is an upper view of FIG. 4.

The holder 130 of the condensing optical lens 134 includes a channel 136 through which cooling water passes, which is connected via a coupling 202 to a pipe 200 for supplying and draining the cooling water.

The holder 140 of the diverging optical lens 142 also includes a channel 144, and the channel 144 is communicated via a channel 164 of the first mirror 160 to a channel 154 of the rectangular optical waveguide 150. The holder 172 of the re-condensing optical lens 170 includes a channel 174. The second mirror 180 also includes a channel 184, and the optical waveguide nozzle 190 includes a channel 194.

The laser hardening tool 100 can be effectively cooled by circulating cooling water supplied via the pipe 200 from a cooling water supply not shown throughout the whole laser hardening tool 100 via the channels.

Figure 6:
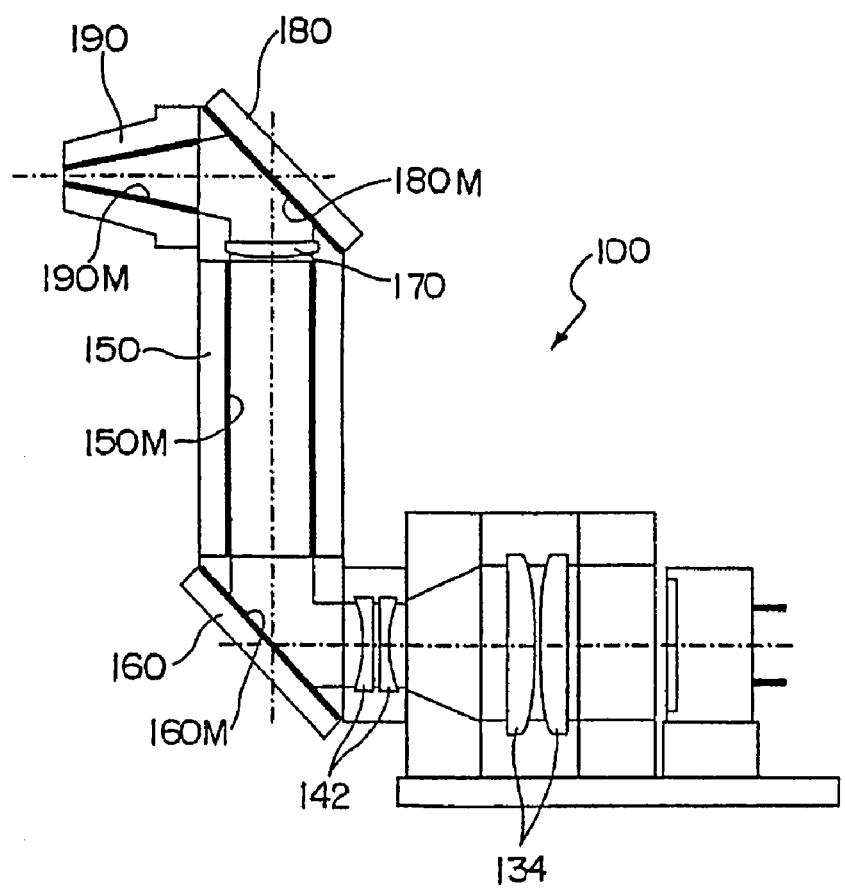
FIG. 6 is a cross-sectional side view showing the arrangement of mirrors of the laser hardening tool according to the present invention.

FIG. 6 is an explanatory view showing the layout of the optical lens 134, 142 and 170, mirror surfaces 160M and 180M of the mirrors 160 and 180, a rectangular planar mirror surface 150M of the rectangular optical waveguide 150, and a circular conic mirror surface 190M on the inner surface of the optical waveguide nozzle 190 of the laser hardening tool 100.

A reflection amplifying coating is applied to the mirror surfaces in order to enhance the reflectivity. Gold plating is adopted for example as the reflection amplifying coating.

Figure 7:
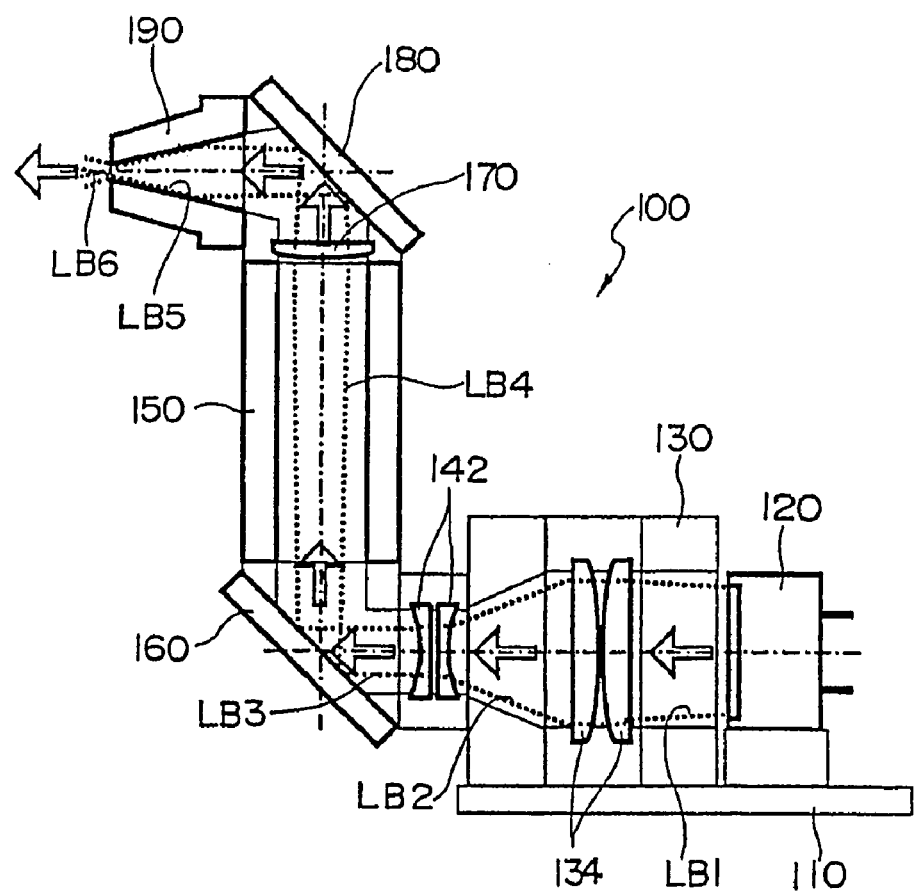
FIG. 7 is a cross-sectional side view illustrating the flow of laser beam of the laser hardening tool according to the present invention.
Figure 8:
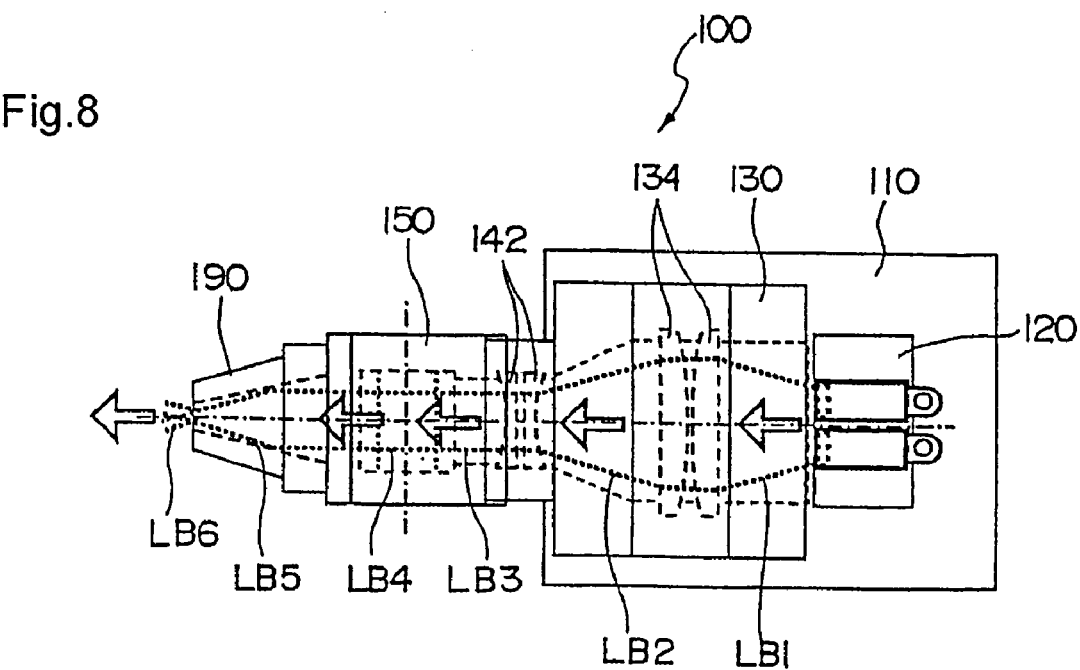
FIG. 8 is an upper view of FIG. 7.
Figure 9:
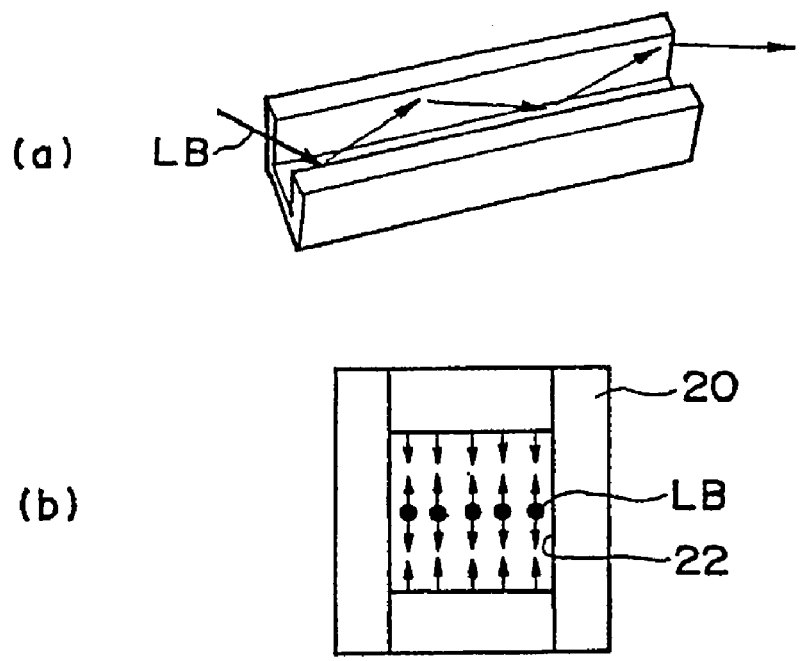
FIG. 9 is an explanatory view showing the operation of the rectangular optical waveguide according to the present invention.
Figure 10:
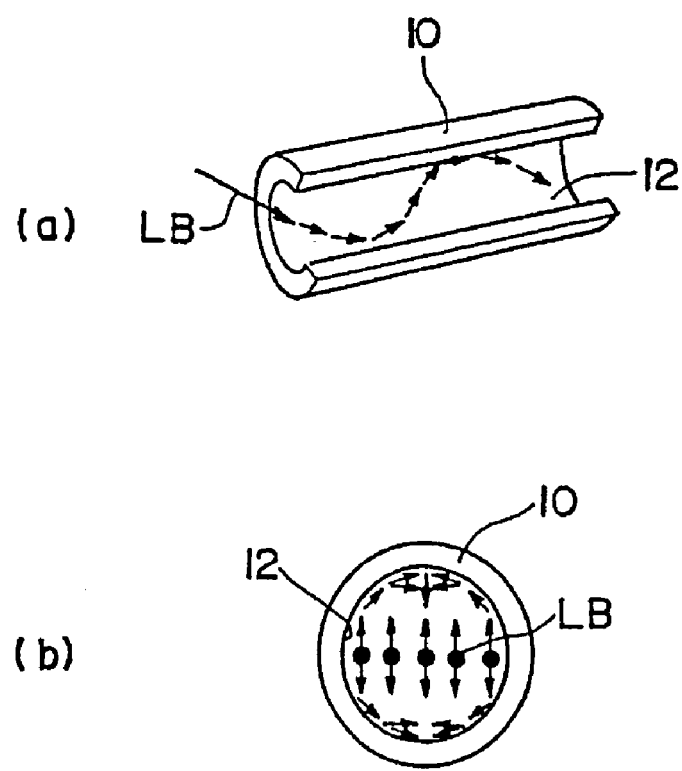
FIG. 10 is an explanatory view showing the operation of a prior art optical waveguide.

FIG. 7 is a cross-sectional side view showing the laser passage of a laser hardening tool 100 according to the present invention, and FIG. 8 is an upper view of FIG. 7.

The laser beams $LB_1$ irradiated from the semiconductor laser stack 120 are condensed by the condensing optical lens 134, become laser beams $LB_2$ and enter the diverging optical lens 142.

The laser beams $LB_3$ having exited the diverging optical lens 142 are bent orthogonally via the mirror 160 substantially as parallel light, and travel through the rectangular optical waveguide 150 as laser beams $LB_4$. The laser beams $LB_4$ passing through the rectangular optical waveguide 150 are subjected to smaller number of reflections, and thus the loss thereof is small.

By providing a diverging optical lens at the entrance of the rectangular optical waveguide 150 and appropriately designing the curvature of the lens, the axis line of the introduction light can be made as parallel as possible with the axis line of the rectangular optical waveguide 150.

According to this means, it becomes possible to reduce the number of reflections of the laser beams within the rectangular optical waveguide 150 and reduce energy loss.

Furthermore, by increasing the size of the rectangular optical waveguide 150 as much as possible, it becomes possible to reduce the number of reflections of the laser beams traveling therethrough.

The laser beams having passed through the rectangular optical waveguide 150 are condensed by the re-condensing optical lens 170 and bent for 90 degrees by the mirror 180.

The laser beams $LB_5$ are narrowed down inside the optical waveguide nozzle 190 and output as laser beams $LB_6$. The laser beams $LB_6$ perform hardening of the surface of a work not shown.

According to the laser hardening tool 100 of the present invention, the laser beams from the semiconductor laser stack 120 can be output from the optical waveguide nozzle 190 with only small loss occurring on the way, so an effective hardening treatment can be realized.

According to the above-mentioned embodiment, the shape of the leading opening of the optical waveguide nozzle 190 is round, but the shape thereof can be designed appropriately by assembling triangles, squares, polygons and curves for example to correspond to the shape of the work or the shape of the hardening portion.

Moreover, the axis line of the nozzle can be bent instead of being in a straight line.

What is claimed is:

1. A laser hardening tool comprising:
   a semiconductor laser stack having semiconductors arranged in a matrix for outputting laser beams;
   a condensing optical system for condensing the laser beams output from the semiconductor laser stack;
   a diverging optical system for diverging the laser beams condensed by the condensing optical system so that the axis lines of the laser beams become parallel;
   a rectangular optical waveguide for guiding the parallel laser beams output from the diverging optical system having a rectangular cross-sectional shape;
   a re-condensing optical system for re-condensing the laser beams having traveled through the rectangular optical waveguide; and
   an optical waveguide nozzle for outputting the re-condensed laser beams toward a work.

2. The laser hardening tool according to claim 1, further comprising a first mirror disposed at an inlet port of the rectangular optical waveguide, and a second mirror disposed between the re-condensing optical system and the optical waveguide nozzle.

3. A laser hardening tool comprising:
   a semiconductor laser stack having semiconductors arranged in a matrix for outputting laser beams;
   a condensing optical system for condensing the laser beams output from the semiconductor laser stack;
   a diverging optical system for diverging the laser beams condensed by the condensing optical system so that the axis lines of the laser beams become parallel;
   a rectangular optical waveguide for guiding the laser beams output from the diverging optical system having a rectangular cross-sectional shape;
   a re-condensing optical system for re-condensing the laser beams having traveled through the rectangular optical waveguide;
   an optical waveguide nozzle for outputting the re-condensed laser beams toward a work; and
   a cooling water channel for supplying cooling water provided in a lens holder of the condensing optical system, a lens holder of the diverging optical system, the first mirror, the rectangular optical waveguide, a lens holder of the re-condensing optical system, the second mirror and the optical waveguide nozzle.

4. The laser hardening tool according to claim 1, wherein a mirror surface for reflecting the laser beam is provided with a reflection amplifying coating layer.

* * * * *